United States Patent [19]

Matsuzawa

[11] Patent Number: 5,751,923
[45] Date of Patent: May 12, 1998

[54] BIDIRECTIONAL PRINTER INTERFACE HAVING FUNCTION OF NOTIFYING PRINT DATA ABNORMALITIES FROM PRINTER TO HOST UNIT

[75] Inventor: Kunihiko Matsuzawa, Tokyo, Japan

[73] Assignee: NEC Corporation, Tokyo, Japan

[21] Appl. No.: 578,899

[22] Filed: Dec. 27, 1995

[30] Foreign Application Priority Data

Dec. 27, 1994 [JP] Japan .................... 6-325344

[51] Int. Cl.$^6$ .................... G06F 15/00
[52] U.S. Cl. .................... 395/114; 395/520
[58] Field of Search .................... 395/101, 104, 395/106, 109, 111, 112, 113, 114, 117, 520, 329, 200.01, 200.09, 840, 841, 800, 828; 364/238.1, 238.2, 239.2, 240.1, 240.2; 358/504, 530, 401, 434, 435, 437, 442; 399/8, 9, 18, 19, 38, 62

[56] References Cited

U.S. PATENT DOCUMENTS

| | | | |
|---|---|---|---|
| 4,933,875 | 6/1990 | Kojima | 395/105 |
| 5,220,674 | 6/1993 | Morgan et al. | 395/800 |
| 5,239,627 | 8/1993 | Becu et al. | 395/892 |
| 5,425,135 | 6/1995 | Motoyama et al. | 395/114 |
| 5,507,003 | 4/1996 | Pipkins | 395/851 |
| 5,537,626 | 7/1996 | Kraslavsky et al. | 395/828 |

FOREIGN PATENT DOCUMENTS 5-309920  11/1993  Japan .

*Primary Examiner*—Joseph Mancuso
*Assistant Examiner*—Gabriel I. Garcia
*Attorney, Agent, or Firm*—Foley & Lardner

[57] ABSTRACT

A bidirectional printer interface comprises a print monitoring controller provided for a host unit for controlling a printer connected to the host unit to monitor a print state; an analyzer provided for the printer for analyzing environment data for setting a print environment and print data; a storage provided the printer for analyzing storing the print data analyzed by the analyzer; wherein the analyzer compares data in relation to a print environment included in the print data with the environment data stored in the storage to determine the presence of the difference therebetween, and if the difference between the data is detected, the analyzer transmits the content of the difference between the data to the host unit and wherein the printer monitoring controller notifies the user of the content of the difference between the data transmitted from the analyzer.

11 Claims, 4 Drawing Sheets

BIDIRECTIONAL PRINTER INTERFACE HAVING FUNCTION OF NOTIFYING PRINT DATA ABNORMALITIES FROM PRINTER TO HOST UNIT

BACKGROUNDS OF THE INVENTION

1. Field of the Invention

This invention relates to a bidirectional printer interface for interconnecting a printer and a host unit to bidirectionally communicate therebetween, in particular, to a bidirectional printer interface having a function of notifying print data abnormalities from a printer to a host unit.

2. Description of the Related Art

Generally, this type of bidirectional printer interface is formed by a combination of a printer driver incorporated into a host computer as a host unit, and a firmware controller incorporated into a printer. The printer driver of the host computer sets print conditions, such as a printer model, paper size resolution, and a font type, and transmits print data to the print. The firmware controller of the printer outputs the received print data, according to the print conditions set by the printer driver.

To set print conditions, in the host computer, a screen for setting a print environment is displayed on its display device; various conditions are set using an input device such as a keyboard or a mouse by entering appropriate commands and data. Then the set print conditions are transmitted through the bidirectional printer interface to the printer. The firmware controller of the printer retains the received print conditions and waits to transmit the print data.

An example of the conventional technology using a screen displayed on a display device of a host computer to set a print environment of a printer is disclosed as "APPARATUS FOR SETTING OPERATION ENVIRONMENT FOR PRINTER" in Japanese Unexamined Patent Publication (Kokai) No. Heisei 5-309920. In this publication, a configuration for setting a printer with a menu displayed on a display device comprising a selection means for selecting a function of the printer, an environment data storage means for storing and setting of an operation environment for the printer, a menu storage means for storing the menu where items for environmental setting are associated with display states of the display device, and a display means for displaying a result by the selection means thereon, are disclosed.

The printer transmits print conditions, such as at the beginning of printing and during printing, as well as notifications when the occurrence of physical abnormalities, such as running out of toner or the cover opening, are detected through the bidirectional printer interface to the host computer. The host computer receives these notifications to display on the screen of the display device or to voice output to notify the user.

Thus, in the conventional printer control technology, bidirectional data transmission/reception between a printer and a host computer for controlling the printer is conducted by a bidirectional printer interface.

However, as the printer cable connecting the printer to the host computer printer is a one-way cable, in the conventional bidirectional printer interface as described, while the print data is transmitted and then the print processing is performed, the transmission of the print data of interest cannot be suspended to transmit the data from the printer to the host computer. Therefore, if there is an error in print data or a contradiction to environment data, as the user cannot find them until the data is printed on a paper, print papers are wasted in vain.

SUMMARY OF THE INVENTION

The object of the present invention is to overcome the conventional disadvantage as described and to provide a bidirectional printer interface which can check print data abnormalities prior to the execution of the print processing, and which can notify the host unit of print data abnormalities when they are detected.

According to one aspect of the invention, a bidirectional printer interface comprises a print monitoring controller means provided for a host unit for controlling a printer connected to the host unit to monitor a print state;

an analysis means provided for the printer for analyzing environment data for setting a print environment and print data;

a storage means provided the printer for analyzing storing the print data analyzed by the analysis means;

wherein the analysis means compares data in relation to a print environment included in the print data with the environment data stored in the storage means to determine the presence of the difference therebetween, and if the difference between the data is detected, the analysis means transmits the content of the difference between the data to the host unit;

and wherein the printer monitoring controller means notifies the user of the content of the difference between the data transmitted from the analysis means.

In the preferred construction, the bidirectional printer interface further comprises an output means for printing the content of the difference between the data, according to the result of the comparison of the print data by the analysis means with the environment data.

Also, the bidirectional printer interface further comprises a display means for displaying the content of the difference between the data according to the result of the comparison of the print data by the analysis means with the environment data.

In the above-mentioned construction, the analysis means analyzes the print data received from the host unit, and if a data error is detected, the analysis means transmits the content of the error to the host computer; and the print monitoring controller means notifies the user of the content of the data error transmitted from the analysis means.

Also, the bidirectional printer interface further comprises an output means for printing the content of the difference between the data and the content of the data errors according to the result of the comparison of the print data by the analysis means with the environment data and the presence of the data error in the print data.

Also, the bidirectional printer interface further comprises a display means for displaying the content of the difference between the data and the content of the data errors, according to the result of the comparison of the print data by the analysis means with the environment data and the presence of the data error in the print data.

In the above-mentioned construction, the print monitoring controller means is incorporated into an operating system of the host unit, storing a software for controlling the printer, for monitoring a print state, and for notifying the user of the difference of the print data and the environment data, and operating according to the software.

According to another aspect of the invention, a bidirectional printer interface comprises a print monitoring controller means provided for a host unit for controlling a printer connected to the host unit to monitor a print state;

an analysis means provided for the printer for analyzing environment data for setting a print environment and print data;

a storage means provided the printer for analyzing storing the print data analyzed by the analysis means;

wherein the analysis means compares data in relation to a print environment included in the print data with the environment data stored in the storage means to determine the presence of the difference therebetween, and if the difference between the data is detected, the analysis means transmits the content of the difference between the data to the host unit;

and the analysis means also analyzes the print data from the host unit, in the case that any data error is detected, to transmit the content of the data errors to the host unit;

and wherein the printer monitoring controller means notifies the user of the content of the difference between the data transmitted from the analysis means and the content of the data errors.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be described with reference to the accompanied drawings.

Figure 1:
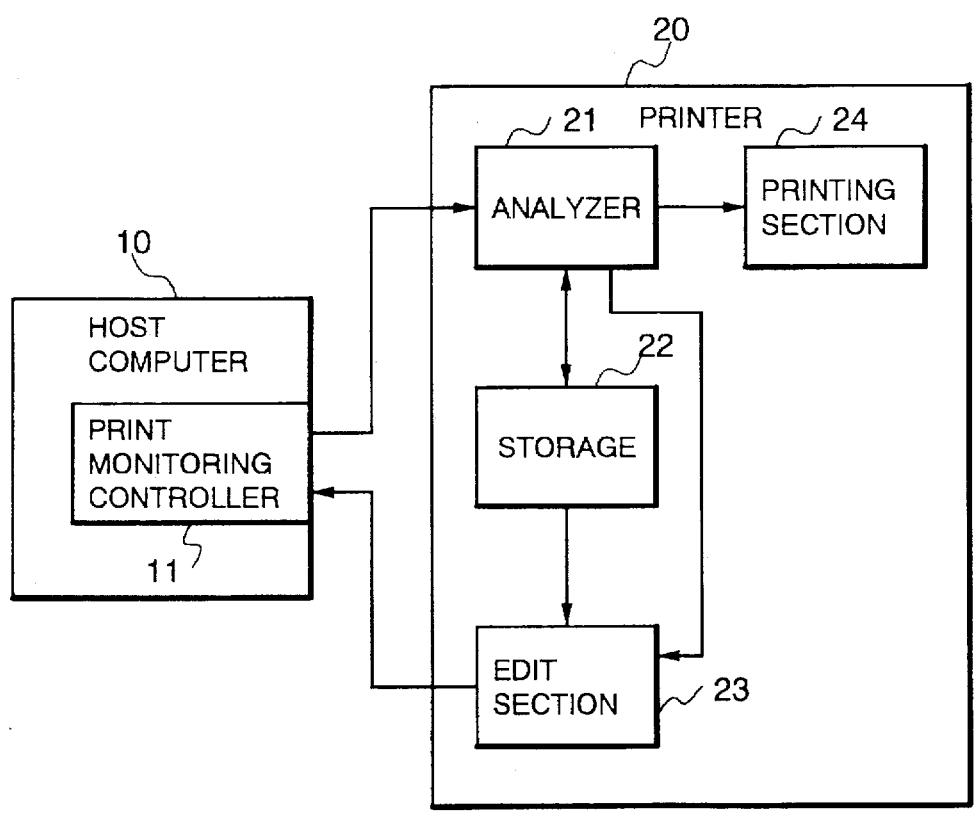
FIG. 1 is a block diagram showing a configuration of a bidirectional printer interface according to the present invention.

FIG. 1 is a block diagram showing a configuration of a bidirectional printer interface according to an embodiment of the present invention.

As shown, a bidirectional printer interface of this embodiment comprises a print monitoring controller 11 for controlling a printer to monitor the print state, an analyzer 21 for analyzing environment data and print data for a print environment setting, a storage 22 for storing environment data, and an edit section 23 for editing a result analyzed by the analyzer 21. The print monitoring controller 11 is also incorporated into a host computer 10 as a host unit; the analyzer 21, the storage 22, and the edit section 23 are incorporated into a printer 20. The host computer 10 and the printer 20 are connected by a printer cable or the like.

However, in this figure, only a configuration characteristic of this embodiment is shown, while other configurations are omitted. Actually, the host computer 10 includes the configuration as shown as well as a processor to operate an application software for creating print data and a display device, the printer 20 including a function processor for monitoring the presence of abnormalities, such as running out of toner and papers or the cover opening.

The print monitoring controller 11 is implemented with a printer driver incorporated into an operating system in the host computer 10, followed by the operation according to a software stored in a storage of the host computer (not shown). That is, the print monitoring controller 11 creates environment data for setting a print environment including printer models, paper size resolutions, and types of Fonts, to transmit to the printer 20. It also analyze the data from the printer 20 to display the analyzed result on the display device (not shown), or to vocal output through a loudspeaker (not shown).

The analyzer 21 is implemented with a CPU mounted in and controlled by the printer 20. The analyzer 21 analyzes the environment data from the host computer 10 and print data and compares the environment data to the print data, before transmitting the analyzed environment data to the storage 22 or various notifications to the edit section 23 according to the analyzed result. Here, print data created by the application software includes data in relation to paper sizes and print directions. Therefore, the analyzer 21 compares the data in relation to the print environment included in the received print data to the environment data pre-stored in the storage 22. If the analyzer 21 analyzes the print data, and if grammatical or command errors are detected in print data, it notifies the edit section 23 that errors have occurred. If a difference between print data and analyzed data is detected, the analyzer 21 notifies the edit section 23 that the difference has been detected. The analyzer 21 is connected to a printing section 24 in the printer 20, which performs the print processing according to the analyzed print data transmitted from the analyzer 21.

The storage 22 is implemented with RAM or the like, storing to retain the analyzed environment data from the analyzer 21.

The edit section 23 is implemented with a CPU or the like mounted on and controlled by the printer 20, creating error or check data for showing an analyzed result of interest according to the notifications and analyzed result to transmit the created data to the host commuter.

Figure 2:
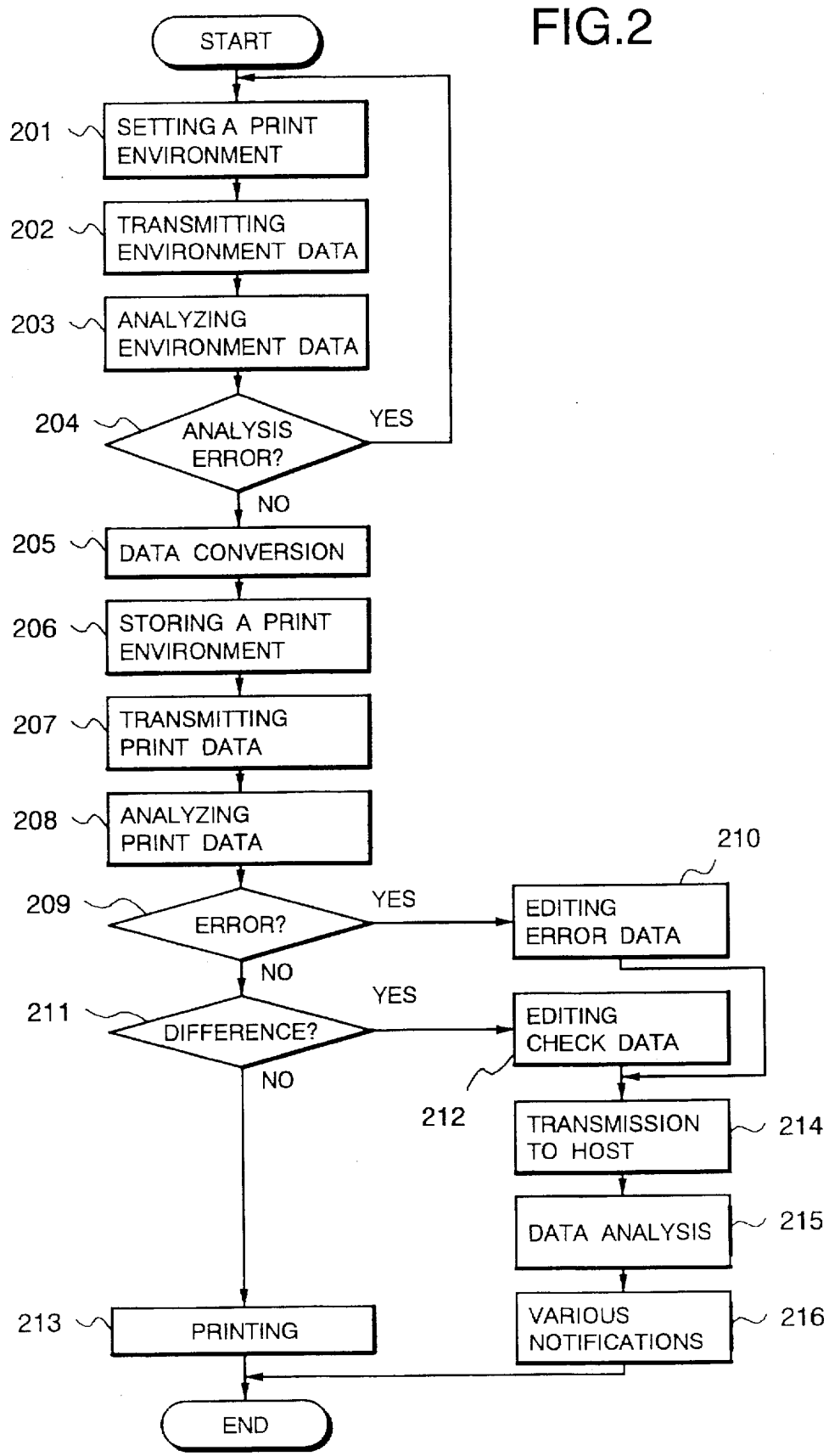
FIG. 2 is a flow chart showing the operation of this embodiment.

Now the operation of this embodiment will be described in reference to the flow chart of FIG. 2.

First, the print monitoring controller 11 creates environment data for setting print environment according to operations of an input device, such as a keyboard or a mouse (step 201). The created environment data is transmitted to the printer 20 (step 202).

The analyzer 21 of the printer 20 receives the environment data transmitted from the print monitoring controller 11 of the host computer 10 to perform the analysis processing (step 203). If an abnormal result is obtained as a result of analysis, for example, in the case that the set content of the print environment is over the limitation for setting conditions, the unfair environment data is notified through the edit section 23 to the host computer 10 to return to create environment data (step 204, 201).

On the other hand, if the environment data is determined to be normal as a result of analysis, the environment data of interest is converted to a format which can be stored into the storage 22, to store the data in the storage 22 (step 205, 206).

Next, in the host computer 10, print data depending on the application software is created to transmit to the printer 20 (step 207).

The analyzer 21 of the printer 20 receives the print data transmitted from the host computer 10 to perform the analysis processing (step 208). Here, when an error, such as a grammatical or command error, is detected, the error detection is notified of the edit section 23, which creates error data for making the host computer 10 check errors (step 209, 210). Also, the data in relation to print environment included in the print data is compared with the data stored in the storage 22. If the difference between the data is detected, the difference detection in the edit section 23 is notified, the edit section 23 creates check data for making the host computer 10 check the difference between the print data and the environment data (step 211, 212). The edit section 23 transmits the error or check data created to the host computer 10 (step 214).

The print monitoring controller 11 of the host computer 10 receives the error or check data transmitted from the printer 20 to analyze (step 215). Then, according to errors or the content of the difference between the print data and environment data, a message for announcing the errors or the content of difference is displayed on the display device or voice outputted to the user (step 216). For example, if the notification processing of these errors or the content of the difference of print data and environment data to the user is performed in an interactive manner, the user can check particular errors or the content of the difference.

On the other hand, if any errors or the difference with the environment data are not detected in print data, the printing section 24 in the printer 20 unarchives the print data of interest to image memory to print on a paper (step 213).

In the example of the operation, the print data transmission is always after the environment data transmission in each printing operation; however, once environment data is transmitted and stored in the storage 22 of the printer 20, only print data with the application software may be transmitted to compare the environment data pre-stored in the storage 22, except when new environment data is transmitted in order to update the environment data of interest.

As described, according to this embodiment, in the printer, print data abnormalities are checked; if print data abnormalities are detected, they are designed to be notified to the host unit; the user can check and correct print data abnormalities before the performance of the print processing. Therefore waste of papers by a simple setting misoperation, such as in the misunderstanding of the user can be reduced.

Figure 3:
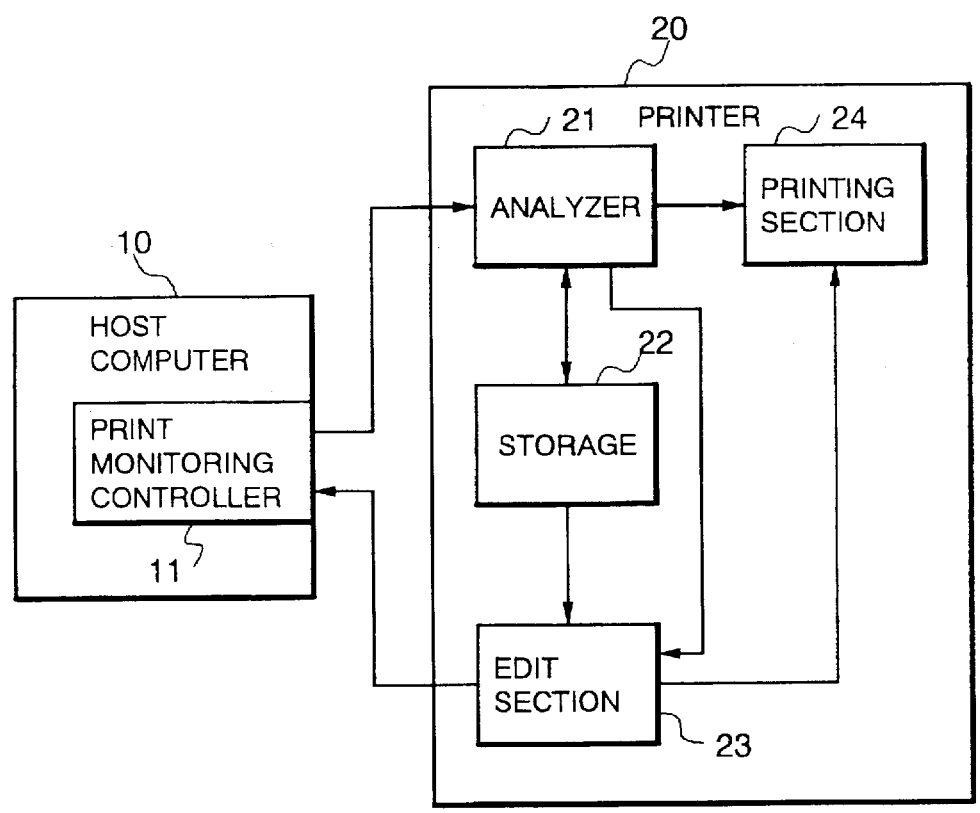
FIG. 3 is a block diagram showing a configuration of a bidirectional printer interface according to another embodiment of the present invention.

FIG. 3 is a block diagram of a configuration of a bidirectional printer interface of a further embodiment according to the present invention.

As shown, the bidirectional printer interface of the embodiment comprises a print monitoring controller 11 for controlling a printer to monitor a print state, an analyzer 21 for analyzing environment data for setting print environment and print data, a storage 22 for storing environment data, and an edit section 23 for editing results analyzed by the analyzer. The print monitoring controller 11 is incorporated into the host computer 10 as a host unit, while the analyzer 21, storage 22 and edit section 23 are incorporated into the printer 20. As the function of each component is the same as each counterpart of the first embodiment in FIG. 1, the identical numerics are assigned to omit their description.

In this embodiment, if the analyzer 21 detects errors of print data, and if the difference between print data and the environment data pre-stored in the storage 22, the edit section 23 creates the error and check data transmitted to the host computer 10; however, the error and check data are also transmitted to the printing section 24, which unarchives the error and check data to image memory to print on the paper.

According to the embodiment, if any error or the difference with the environment data in with print data is detected, as the content of the error of interest or the like is printed, the user can reference the content to correct print data. Further, in this embodiment, compared to the embodiment in FIG. 1 as described, although a paper for printing the content including errors will be consumed, waste of papers can be reduced in comparison with printing data using large amount of papers without noticing simple setting misoperation.

Figure 4:
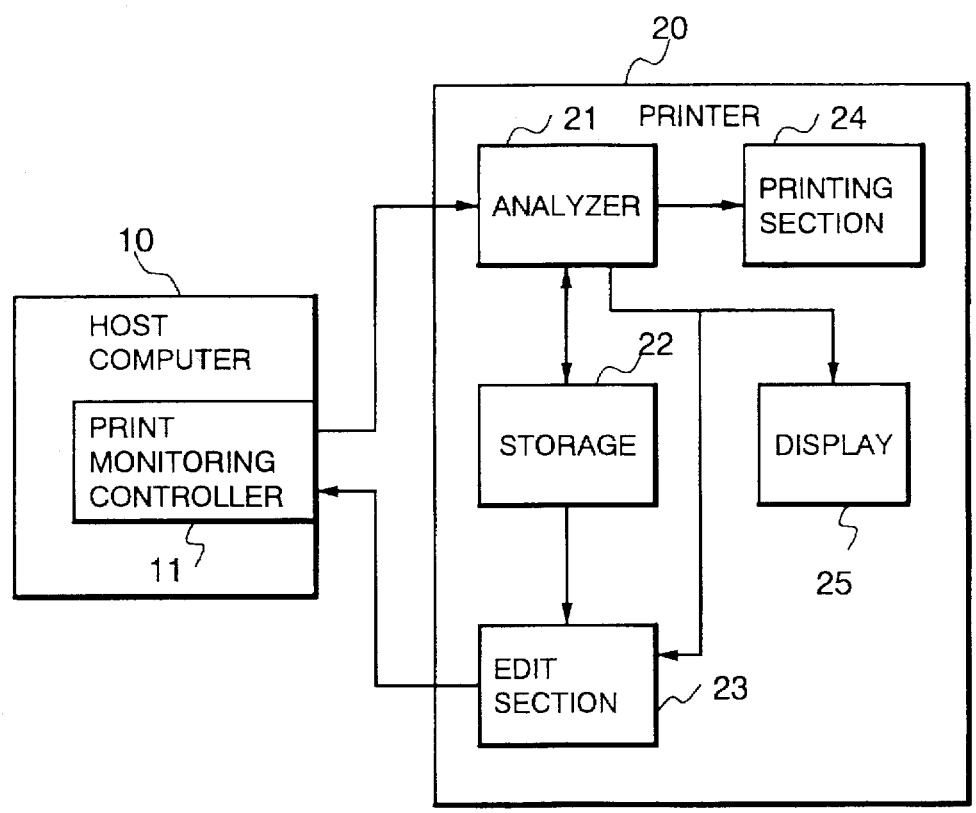
FIG. 4 is a block diagram showing a configuration of a bidirectional printer interface according to a further embodiment of the present invention.

FIG. 4 is a block diagram showing a configuration of a bidirectional printer interface of a further embodiment according to the present invention.

As shown, the bidirectional printer interface of this embodiment comprises a print monitoring controller 11 for controlling a printer to monitor a print state, an analyzer 21 for analyzing environment data for setting print environment and print data, a storage 22 for storing environment data, an edit section 23 for editing results analyzed by the analyzer, and a display 25 to display the result analyzed by the analyzer 21. The print monitoring controller 11 is incorporated into the host computer 10 as the host unit, while the analyzer 21, storage 22, edit section 23, and display 23 are incorporated into the printer 20.

The display 25 is implemented with a liquid crystal display device or a display lamp or the like, which displays the presence of errors in print data or the difference between print data and environment data, according to the result analyzed by the analyzer 21. The user can reference the content displayed on the display 25 to check errors in print data or the presence of the difference with environment data. As the function of each component is the same as the counter part in FIG. 1, the same numeral is assigned to omit the description.

As described hereabove, as the present invention is designed to make the printer check print data abnormalities, in the case of the detection of print data abnormalities, to notify the host unit thereof, the user can check print data abnormalities before the execution of the print processing. Therefore waste of papers by a simple setting misoperation including a misunderstanding by the user can be advantageously reduced.

Although the invention has been illustrated and described with respect to exemplary embodiments thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A bidirectional printer interface comprising:

a print monitoring controller means provided for a host unit for controlling a printer connected to the host unit to monitor a print state, for generating environment data for setting a print environment of print data, and for transmitting the environment data to the printer;

an analysis means for analyzing the environment data and the print data;

a storage means for storing the environment data analyzed by the analysis means; and an edit means for creating a check data for making the host unit check the content for any difference and transmitting the check data to the host unit, wherein the analysis means compares data in relation to a print environment included in the print data with the environment data stored in the storage means to determine the presence of any difference therebetween, and if the difference between the data in relation to a print environment and the environment data is detected, the analysis means notifies the edit means of the detection of the difference, and if the difference is not detected, the analysis means makes the printer print the print data, wherein the edit means creates and transmits the check data to the host unit when receiving the detection of the difference from the analysis means, and wherein the printer monitoring controller means analyzes the check data received from the edit means, and makes the host unit display the result of the analysis as a confirmation message that enables the notification by an interactive mode to a user.

2. A bidirectional printer interface as set forth in claim 1, further comprising:

an output means for printing the content of the difference between the print data and the environment data according to the result of the comparison made by the analysis means.

3. A bidirectional printer interface as set forth in claim 1, further comprising:

a display means for displaying the content of the difference between the print data and the environment data according to the result of the comparison made by the analysis means.

4. A bidirectional printer interface as set forth in claim 1, wherein the analysis means also analyzes the print data received from the host unit, and if any data error is detected, the analysis means notifies the edit means the detection of data errors and wherein the print monitoring controller means analyzes the error data received from the edit means and makes the host unit display the result of the analysis as a confirmation message that enables the notification by an interactive mode to a user.

5. A bidirectional printer interface as set forth in claim 4, further comprising:

an output means for printing the data errors according to the result of the comparison made by the analysis means in the presence of the data error in the print data.

6. A bidirectional printer interface as set forth in claim 4, further comprising:

a display means for displaying the content of the difference between the print data and the environment data according to the result of the comparison made by the analysis means in the presence of the data error in the print data.

7. A bidirectional printer interface as set forth in claim 1, wherein the print monitoring controller means is incorporated into an operating system of the host unit, storing a software for controlling the printer, for monitoring a print state, and for notifying the user of the difference of the print data and the environment data, and operating according to the software.

8. A bidirectional printer interface comprising:

a print monitoring controller means provided for a host unit for controlling a printer connected to the host unit to monitor a print state, for generating environment data for setting a print environment of print data, and for transmitting the environment data to the printer;

an analysis means for analyzing the environment data and the print data;

a storage means for storing the environment data analyzed by the analysis means; and an edit means for creating a check data for making the host unit check the content for any difference and transmitting the check data to the host unit and for creating an error data for making the host unit check the content for any data errors and transmitting the error data to the host unit, wherein the analysis means compares data in relation to a print environment included in the print data with the environment data stored in the storage means to determine the presence of any difference therebetween, and if the difference between the data in relation to a print environment and the environment data is detected, the analysis means notifies said edit means the detection of the difference and if no difference is detected, the analysis means makes the printer print the print data, wherein the analysis means also analyzes the print data from the host unit, and when any data error is detected, the analysis means notifies the edit means the detection of the data errors, wherein the edit means creates and transmits the check data to the host unit when receiving the detection of any difference from said analysis means, wherein the edit means creates and transmits the error data to the host unit when receiving the detection of the data errors from said analysis means, and wherein the printer monitoring controller means analyzes the check data and the error data received from the edit means and makes the host unit display the result of the analysis as a confirmation message that enables the notification by an interactive mode to a user.

9. A bidirectional printer interface as set forth in claim 8, further comprising:

an output means for printing the content of the difference between the print data and the environment data according to the result of the comparison made by the analysis means in the presence of the data error in the print data.

10. A bidirectional printer interface as set forth in claim 8, further comprising:

a display means for displaying the content of the difference between the print data and the environment data according to the result of the comparison made by the analysis means in the presence of the data error in the print data.

11. A bidirectional printer interface as set forth in claim 8, wherein the print monitoring controller means is incorporated into an operating system of the host unit, storing a software for controlling the printer, for monitoring a print state, and for notifying the user of the difference of the print data and the environment data, and operating according to the software.

* * * * *